Oct. 14, 1930.  H. EERKES  1,778,589
DISPENSING APPARATUS
Filed Sept. 10, 1928  2 Sheets-Sheet 1
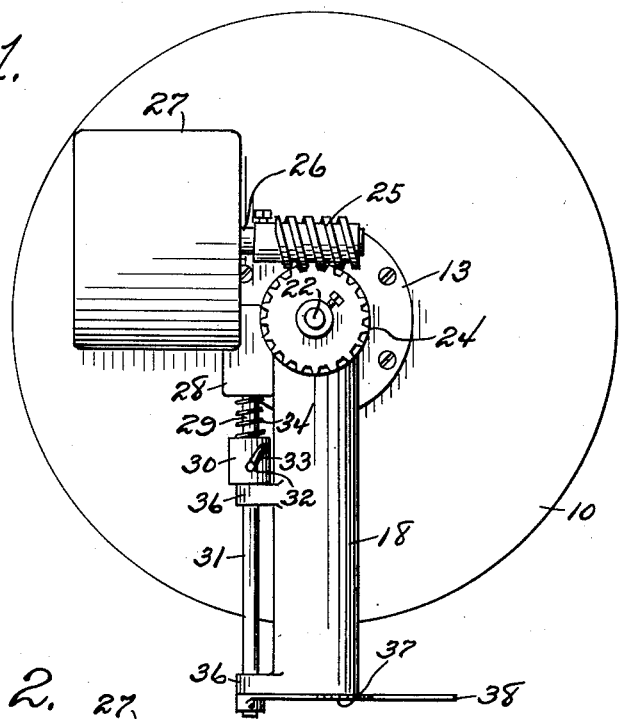
Fig. 1.
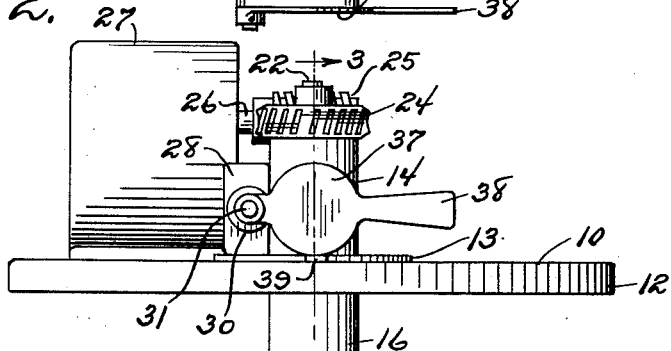
Fig. 2.
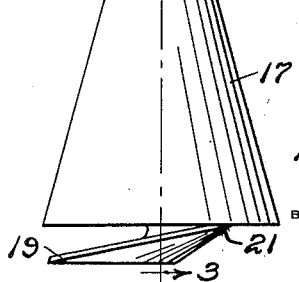
Herbert Eerkes
INVENTOR
BY Victor J. Evans
ATTORNEY
WITNESS Oct. 14, 1930.   H. EERKES   1,778,589
DISPENSING APPARATUS
Filed Sept. 10, 1928   2 Sheets-Sheet 2
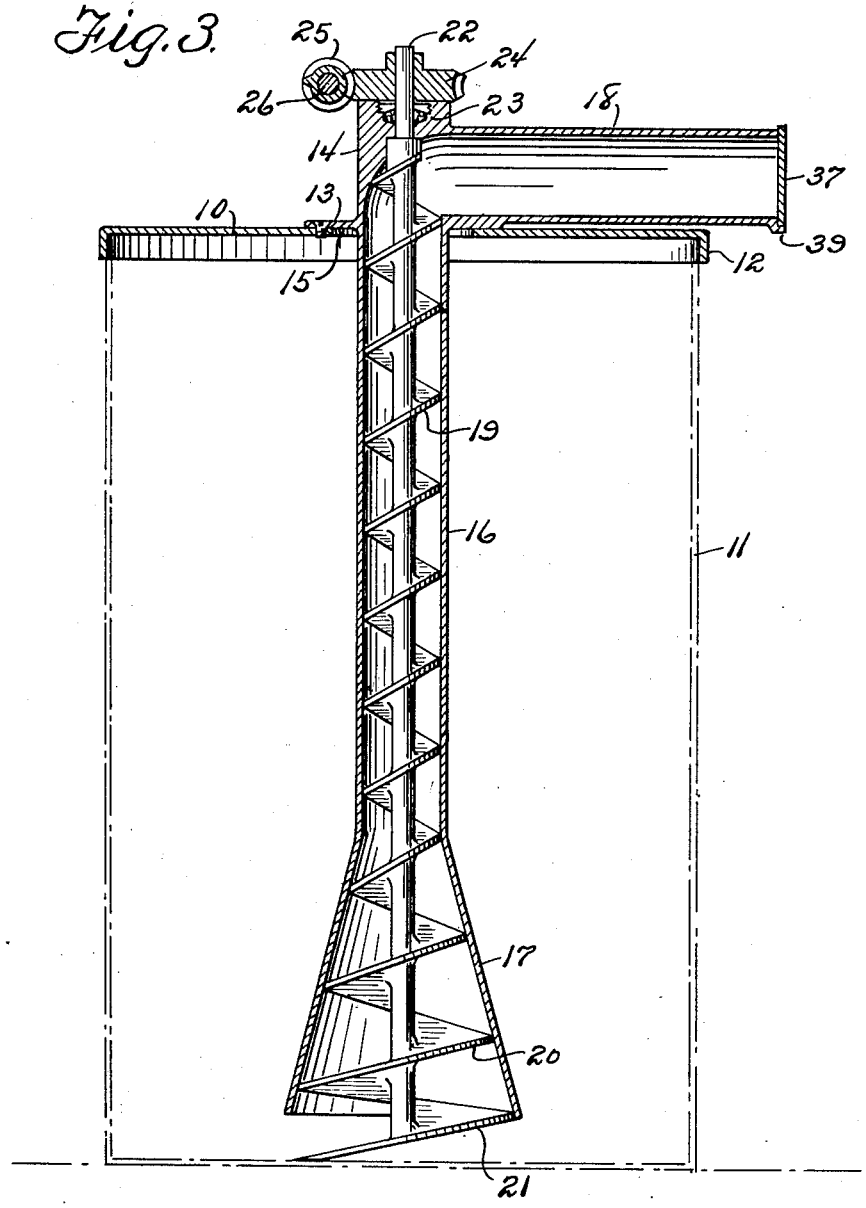

Patented Oct. 14, 1930

1,778,589

UNITED STATES PATENT OFFICE

HERBERT EERKES, OF LYNDEN, WASHINGTON

DISPENSING APPARATUS

Application filed September 10, 1928. Serial No. 305,089.

This invention relates to dispensing apparatus especially designed for dispensing peanut butter and like commodities, an object being to provide means associated with a container for forcing the contents thereof outward through a discharge spout, so that the contents may at all times be covered to retard evaporation, and to keep said contents in a sanitary and wholesome condition.

Another object of the invention is the provision of motor operated means for forcing the contents of the container through the discharge spout, and means for closing the spout, together with means operated by the spout closing means to control the operation of the motor.

With the above and other objects in view, the invention further includes the following novel features and details of construction, to be hereinafter more fully described, illustrated in the accompanying drawings and pointed out in the appended claim.

In the drawings:—

Figure 1 is a plan view of the invention.

Figure 2 is an elevation of the same partly broken away.

Figure 3 is a vertical sectional view illustrating a container by dotted lines and showing the position of the invention with respect to the container.

Referring to the drawings in detail wherein like characters of reference denote corresponding parts, the device which is of unitary construction and adapted to be removably secured to a container, comprises a container cover 10 which is adapted to be removably positioned upon a container indicated at 11, the cover being supplied with a flange 12 for this purpose.

Peanut butter is packed in cans containing approximately eighty pounds and is sold from these cans. This method of handling the butter is unsanitary and results frequently in a condition wherein the butter is so thin with oil that it is difficult to dip it, or so thick that it is difficult to force a spoon or dipper into it.

It is the purpose of the present invention to overcome these and other disadvantageous features by providing a dispensing apparatus which may be carried by a cover and removably positioned upon a can which, in addition to dispensing peanut butter will keep the same properly agitated and mixed so that the butter is evenly dispensed.

For this purpose, the cover 10 has secured thereto as shown at 13 a head 14 and depending from this head and extending downwardly through an opening 15 provided in the cover is a tubular member 16 whose bottom is outwardly flared as shown at 17. Communicating with the upper end of the tubular member is a radially extending discharge spout 18.

The tubular member 16 has its lower end spaced from the bottom of the container and operating within this tubular member is a spiral conveyor 19. The lower end of this conveyor is shaped to conform to the shape of the outwardly flared end of the tubular member as shown at 20, and the lower extremity of the spiral conveyor extends downward below the bottom edge of the flared portion of the tubular member as shown at 21.

The spiral conveyor 19 has the upper end of its shaft 22 extending through a packing gland 23, and mounted upon the upper end of this shaft is a worm gear 24 which is engaged and driven by a worm 25, the latter being secured to the shaft 26 of an electric motor 27.

The motor 27 is controlled by a switch, preferably of the push and pull type whose casing is indicated at 28, and extending from this casing is an operating rod 29 upon the outer end of which is secured a head 30. This head is provided with a central bore to receive the inner end of a rock shaft 31 and this shaft carries a pin 32 which operates within a cam slot 33 provided in the head 30. The head is secured to the rod 29 and is yieldingly forced outward by a spring 34 which encircles the rod. The rock shaft 31 is mounted in bearings 36 which extend from the discharge spout 18 and this shaft has secured to its outer end a disk 37 which is provided with an operating handle 38. This disk provides a closure or cut off for the outer end of the discharge spout and its downward movement is limited by means of a stop 39.

The invention is designed to be removably positioned upon the top of a container while the motor is connected with a suitable source of current, in the circuit of which is included the switch 28. By raising the cut off disk or closure 37 to permit of the discharge of the contents of the container, the motor switch is closed through the pin and cam connection of the rock shaft 31 with the head 30, so that the motor will be started. Operation of the motor will operate the conveyor 19 and its extended portion 21 will collect the peanut butter and force the latter upward and out through the discharge spout 18. By closing the outer end of the discharge spout through the medium of the cut off 37, the switch 28 will be permitted to open under the action of the spring 34, so that the operation of the motor will be automatically cut off.

The invention is susceptible of various changes in its form, proportions and minor details of construction and the right is herein reserved to make such changes as properly fall within the scope of the appended claim.

Having described the invention what is claimed is:

A dispensing unit for the delivery of substantially fluid material from a container to a receptacle, the said unit comprising a cover to be fitted to the container, a head mounted at the center of the cover, a conduit extending downwardly from the cover into the container, a discharge spout extending radially from the head and in communication with the conduit, a shaft mounted in the head and extending axially within the conduit, a helical conveyor blade upon the shaft within the conduit, an electric motor upon the said cover, operative gear connection between the motor and the said shaft, a push-pull switch mounted upon the cover and in circuit with the motor, and including the usual plunger, the said switch being located opposite the inner end of the spout, a shaft mounted for rotary adjustment upon the side of the spout and in alinement with the switch plunger, a closure plate mounted upon the forward end of the last mentioned shaft and movable into and out of position to close the delivery end of the spout, a sleeve, upon the outer end of the switch plunger, provided with an arcuate slot, a pin rotatable with the last mentioned shaft and engaging in the said slot whereby rotation of the said last mentioned shaft through movement of the closure to open position will effect longitudinal movement of the sleeve and switch plunger to close the switch, and a compression spring upon the switch plunger bearing between the said switch and the said sleeve and yieldably urging the sleeve in an outward direction.

In testimony whereof I affix my signature.

HERBERT EERKES.